(12) United States Patent
Welch et al.

(10) Patent No.: US 9,792,715 B2
(45) Date of Patent: Oct. 17, 2017

(54) METHODS, SYSTEMS, AND COMPUTER READABLE MEDIA FOR UTILIZING SYNTHETIC ANIMATRONICS

(71) Applicant: The University of North Carolina at Chapel Hill, Chapel Hill, NC (US)

(72) Inventors: Gregory Welch, Longwood, FL (US); Kurtis P. Keller, Hillsborough, NC (US); Andrei State, Chapel Hill, NC (US); Henry Fuchs, Chapel Hill, NC (US); Ryan Edward Schubert, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 101 days.

(21) Appl. No.: 14/401,834

(22) PCT Filed: May 17, 2013

(86) PCT No.: PCT/US2013/041608
§ 371 (c)(1),
(2) Date: Nov. 17, 2014

(87) PCT Pub. No.: WO2013/173724
PCT Pub. Date: Nov. 21, 2013

(65) Prior Publication Data
US 2015/0178973 A1    Jun. 25, 2015

Related U.S. Application Data

(60) Provisional application No. 61/648,384, filed on May 17, 2012.

(51) Int. Cl.
*G06T 13/40* (2011.01)
*G06T 19/00* (2011.01)
(Continued)

(52) U.S. Cl.
CPC .............. *G06T 13/40* (2013.01); *G06T 1/00* (2013.01); *G06T 15/04* (2013.01); *G06T 19/006* (2013.01); *G09F 19/08* (2013.01)

(58) Field of Classification Search
CPC ....... G06T 13/40; G06T 15/04; G06T 19/006; G06T 1/00; G09F 19/08
See application file for complete search history.

(56) References Cited

U.S. PATENT DOCUMENTS 1,653,180 A    12/1927  Jalbert
3,973,840 A     8/1976  Jacobs et al.
(Continued)

FOREIGN PATENT DOCUMENTS

JP         06-110131        4/1994
WO    WO 2007/008489 A2    1/2007
(Continued)

OTHER PUBLICATIONS

Tyler Johnson, Florian Gyarfas, Rick Skarbez, Herman Towles and Henry Fuchs, "A Personal Surround Environment: Projective Display with Correction for Display Surface Geometry and Extreme Lens Distortion", IEEE Virtual Reality Conference Mar. 10-14, 2007, p. 147-154.*

(Continued)

*Primary Examiner* — Sing-Wai Wu
(74) *Attorney, Agent, or Firm* — Jenkins, Wilson, Taylor & Hunt, P.A.

(57) ABSTRACT

Methods, systems, and computer readable media for utilizing synthetic animatronics are disclosed. According to one aspect, a method for synthetic animatronics includes providing a display surface having different regions that accommodate different positions or deformations of a subject, mapping images of the subject to the different regions on the display surface, and displaying the mapped images on the (Continued)

different regions of the display surface at different times in accordance with a desired animation of the subject.

12 Claims, 6 Drawing Sheets

(51) Int. Cl.
    *G06T 1/00*          (2006.01)
    *G09F 19/08*        (2006.01)
    *G06T 15/04*        (2011.01)

(56) References Cited

U.S. PATENT DOCUMENTS

| | | | |
|---|---|---|---|
| 4,076,398 A | 2/1978 | Galbraith | |
| 4,104,625 A | 8/1978 | Bristow et al. | |
| 4,978,216 A | 12/1990 | Liljegren et al. | |
| 5,221,937 A | 6/1993 | Machtig | |
| 5,465,175 A | 11/1995 | Woodgate et al. | |
| 5,502,457 A * | 3/1996 | Sakai | G02B 6/06 345/87 |
| 6,283,598 B1 | 9/2001 | Inami et al. | |
| 6,467,908 B1 | 10/2002 | Mines et al. | |
| 6,504,546 B1 | 1/2003 | Cosatto et al. | |
| 6,806,898 B1 | 10/2004 | Toyama et al. | |
| 6,970,289 B1 | 11/2005 | Auerbach et al. | |
| 7,068,274 B2 | 6/2006 | Welch et al. | |
| 7,095,422 B2 | 8/2006 | Shouji | |
| 7,212,664 B2 | 5/2007 | Lee et al. | |
| 7,292,269 B2 | 11/2007 | Raskar et al. | |
| 9,538,167 B2 | 1/2017 | Welch et al. | |
| 2002/0015037 A1 | 2/2002 | Moore et al. | |
| 2002/0024640 A1* | 2/2002 | Ioka | G03B 21/13 353/94 |
| 2005/0017924 A1 | 1/2005 | Utt et al. | |
| 2005/0162511 A1 | 7/2005 | Jackson | |
| 2008/0117231 A1 | 5/2008 | Kimpe | |
| 2010/0007665 A1 | 1/2010 | Smith et al. | |
| 2010/0159434 A1 | 6/2010 | Lampotang et al. | |
| 2011/0234581 A1 | 9/2011 | Eikelis et al. | |
| 2012/0038739 A1 | 2/2012 | Welch et al. | |
| 2012/0093369 A1 | 4/2012 | Ryu | |
| 2016/0323553 A1 | 11/2016 | Fuchs et al. | |

FOREIGN PATENT DOCUMENTS

| | | |
|---|---|---|
| WO | WO 2008/112165 A1 | 9/2008 |
| WO | WO 2008/112212 A1 | 9/2008 |
| WO | WO 2010/102288 A2 | 9/2010 |
| WO | WO 2015/070258 A1 | 5/2015 |

OTHER PUBLICATIONS

Notification of Transmittal of the International Search Report and the Written Opinion of the International Searching Authority, or the Declaration for International Application No. PCT/US2013/041608 (Aug. 22, 2013).
Advisory Action for U.S. Appl. No. 13/254,837 (Mar. 2, 2015).
Final Office Action for U.S. Appl. No. 13/254,837 (Oct. 20, 2014).
Non-Final Office Action for U.S. Appl. No. 13/254,837 (Mar. 17, 2014).
Notification Concerning Transmittal of International Preliminary Report on Patentability (Chapter I of the Patent Cooperation Treaty) for International Patent Application No. PCT/US2010026534 (Sep. 15, 2011).
Notification of Transmittal of International Search Report and the Written Opinion of the International Searching Authority, or the Declaration for International Patent Application No. PCT/US2010026534 (Oct. 22, 2010).
Ahlberg et al., "Face tracking for model-based coding and face animation," International Journal of Imaging Systems and Technology, 13(1):8-22 (2003).
AIST, "Successful development of a robot with appearance and performance similar to humans," http://www.aist.go.jp/aist e/latest research/2009/ 20090513/20090513.html (May 2009).
Allen, "Hardware Design Optimization for Human Motion Tracking Systems," Ph.D. dissertation, The University of North Carolina at Chapel Hill, Department of Computer Science, Chapel Hill, NC, USA, pp. 1-100 (Nov. 2007) (Part 1 of 2).
Allen, "Hardware Design Optimization for Human Motion Tracking Systems," Ph.D. dissertation, The University of North Carolina at Chapel Hill, Department of Computer Science, Chapel Hill, NC, USA, pp. 101-190 (Nov. 2007) (Part 2 of 2).
Allen et al., "A general method for comparing the expected performance of tracking and motion capture systems," In VRST '05: Proceedings of the ACM symposium on Virtual reality software and technology, pp. 201-210, Monterey, CA, USA, ACM Press, New York, NY, USA (Nov. 2005).
Allen et al., "Tracking: Beyond 15 minutes of thought: Siggraph 2001 course 11," In Compurter Graphics, Annual Conference on Computer Graphics & Interactive Techniques. ACM Press, Addison-Wesley, Los Angeles, CA, USA (Aug. 12-17), siggraph 2001 coursepack edition, (2001).
Androutsellis-Theotokis et al., "A survey of peer-to-peer content distribution technologies," ACM Comput. Surv., 36(4):335-371 (2004).
Azuma et al., "Tracking in unprepared environments for augmented reality systems," Computers & Graphics, 23(6):787-793 (1999).
Azuma, et al., "Making augmented reality work outdoors requires hybrid tracking," In First International Workshop on Augmented Reality, pp. 219-224, San Francisco, CA, USA (1998).
Azuma et al., "Space-resection by collinearity: Mathematics behind the optical ceiling head-tracker," Technical Report 91-048, University of North Carolina at Chapel Hill (Nov. 1991).
Bandyopadhyay et al., "Dynamic shader lamps: Painting on real objects," In Proc. IEEE and ACM International Symposim on Augmented Reality (ISAR '01), pp. 207-216, New York, NY, USA, IEEE Computer Society (Oct. 2001).
Biocca et al., "Visual touch in virtual environments: An exploratory study of presence, multimodal interfaces, and cross-modal sensory illusions," Presence: Teleoper. Virtual Environ., 10(3):247-265 (2001).
Bioshop, "The Self-Tracker: A Smart Optical Sensor on Silicon," Ph.d. dissertation, University of North Carlina at Chapel Hill, 1984. by Gary Bishop. ill. ; 29 cm. Thesis (Ph.D.) University of North Carolina at Chapel Hill (1984).
DeAndrea, AskART, http://www.askart.com/askart/d/john louis de andrea/john louis de andrea.aspx (May 2009).
Epstein, "My date with a robot," ScientificAmericanMind, pp. 68-73 (Jun./Jul. 2006).
Foxlin et al., "Weartrack: a self-referenced head and hand tracker for wearable computers and portable vr," Wearable Computers, 2000. The Fourth International Symposium on, pp. 155-162 (2000).
Fretzagias et al., "Cooperative location-sensing for wireless networks," In PERCOM '04: Proceedings of the Second IEEE Internatonal Conference on Pervasive Computing and Communications (PerCom'04), p. 121, Washington, DC, USA, IEEE Computer Society (2004).
Garau et al, "The impact of avatar realism and eye gaze control on perceived quality of communication in a shared immersive virtual environment," In CHI '03: Proceedings of the SIGCHI conference on Human factors in computing systems, pp. 529-536, New York, NY, USA, ACM (Apr. 5-10, 2003).
Garau et al., "The impact of eye gaze on communication using humanoid avatars," In CHI '01: Proceedings of the SIGCHI conference on Human factors in computing systems, pp. 309-316, New York, NY, USA, ACM (2001).
Gleicher, "Retargeting motion to new characters," In SIGGRAPH '98: Proceedings of the 25th annual conference on Computer graphics and interactive techniques, pp. 33-42, New York, NY, USA, ACM (1998).
Hendrix et al., "Presence within virtual environments as a function of visual display parameters," Pressence: Teleporators and virtual environments, 5(3):274-289 (1996).

(56) References Cited

OTHER PUBLICATIONS

Honda Motor Co., Ltd. "Honda Develops Intelligence Technologies Enabling Multiple ASIMO Robots to Work Together in Coordination," Corporate News Release (Dec. 11, 2007).
Huang et al., "Visual face tracking and its applicaton to 3d model-based video coding," In Picture Coding Symposium, pp. 57-60 (2001).
Ishiguro, "Intelligent Robotics Laboratory," Osaka University. http://www. is.sys.es.osaka-u.ac.jp/research/index.en.html (May 2009).
Jarmasz et al., "Object-based attention and cognitive tunneling," Journal of Experimental Psychology Applied, 11(1):3-12 (Mar. 2005).
Johnson et al., "A distributed cooperative framework for continuous multi-projector pose estimation," Proceedings of IEEE Virtual Reality 2009 (Mar. 14-18, 2009).
Jones et al., "Achieving eye contact in a one-to-many 3d video teleconferencing system," In SIGGRAPH '09: ACM SIGGRAPH 2009 papers, pp. 1-8, New York, NY, USA, ACM (2009).
Jones et al., "Rendering for an interactive 360° light field display," In SIGGRAPH '07: ACM SIGGRAPH 2007 papers, vol. 26, pp. 40-1-40-10, New York, NY, USA, ACM (2007).
"Various face shape expression robot," http://www.takanishi. mech. waseda.ac.jp/top/research/docomo/index.htm (Aug. 2009).
Lincoln et al., "Multi-view lenticular display for group teleconferencing," Immerscom (2009).
LOOXIS GmbH, "FaceWorx," http://www.looxis.com/en/k75. Downloads Bits-and-Bytes-to-download.htm (Feb. 2009).
Mizell et al., "Immersive virtual reality vs. flat-screen visualization: A measurable advantage," (Submitted for publicaton. 2003).
Mori, "The Uncanny Valley," Energy, 7(4), pp. 33-35 (1970).
Murray et al., "An assessment of eye-gaze potential within immersive virtual environments," ACM Trans. Multimedia Comput. Commun. Appl., 3(4):1-17 (2007).
Nguyen et al., "Multiview: improving trust in group video conferencing through spatial faithfulness," In CHI '07: Proceedings of the SIGCHI conference on Human factors in computing systems, pp. 1465-1474, New York, NY, USA, ACM (2007).
Nguyen et al., "Multiview: spatially faithful group videoconferencing," In CHI '05: Proceedings of the SIGCHI conference on Human factors in computing systems, pp. 799-808, New York, NY, USA, ACM (2005).
Pausch et al., "A user study comparing head-mounted and stationary displays," In Proceedings of IEEE Symposium on Research Frontiers in Virtual Reality, pp. 41-45, IEEE Press (1993).
Phillips, "On the right track a unique optical tracking system gives users greater freedom to explore virtual worlds," Computer Graphics World, pp. 16-18 (Apr. 2000).
Popovic et al., "Physically based motion transformation," In SIGGRAPH '99: Proceedings of the 26th annual conference on Computer graphics and interactive techniques, pp. 11-20, New York, NY, USA, ACM Press/Addison-Wesley Publishing Co. (1999).
Raskar et al., "Shader lamps: Animating real objects with image-based illumination," In Eurographics Work-shop on Rendering (Apr. 2000).
Raskar et al., "Table-top spatially-augmented reality: Bringing physical models to life with projected imagery," In IWAR '99: Pro-ceedings of the 2nd IEEE and ACM International Workshop on Augmented Reality, p. 64, Washington, DC, USA, IEEE Computer Society (1999).
Schreer et al., "3DPresence—A System Concept for Multi-User and Multi-Party Immersive 3D Videoconferencing," pp. 1-8. CVMP 2008 (Nov. 2008).
Seeing Machines. faceAPI. http://www.seeingmachines.com/product/ faceapi/ (May 2009).
Shin et al., "Computer puppetry: An importance-based approach," ACM Trans. Graph., 20(2):67-94 (2001).
Snow, "Charting Presence in Virtual Environments and Its Effects on Performance," PhDthesis, Virginia Polytechnic Institute and State University (Dec. 1996).

Tachi http://projects.tachilab.org/telesar2/ (May 2009).
Tachi et al., "Mutual telexistence system using retro-reflective projection technology," International Journal of Humanoid Robotics, 1(1):45-64 (2004).
Thomas et al., "Visual displays and cognitive tunneling: Frames of reference effects on spatial judgements and change detection," In Proceedings of the 45th Annual Meeting of the Human Factors and Ergonomics Society, Santa Monica, CA, Human Factors & EmonomicsSociety (2001).
Vallidis, "WHISPER: A Spread Spectrum Approach to Occlusion in Acoustic Tracking," Ph.d., University of North Carolina at Chapel Hill (2002).
Vertegaal et al., "Explaining effects of eye gaze on mediated group conversations: amount or synchronization," In CSCW '02: Proceedings of the 2002 ACM conference on Computer supported cooperative work, pp. 41{48, New York, NY, USA, ACM (2002).
Vlasic et al., "Practical motion capture in everyday surroundings," In SIGGRAPH '07: ACM SIGGRAPH 2007 papers, p. 35, New York, NY, USA, ACM (2007).
Vlasic et al., "Face transfer with multilinear models," ACM Trans. Graph., 24(3), pp. 426-433 (2005).
Ward et al., "A demonstrated optical tracker with scalable work area for head-mounted display systems," In Symposium on Interactive 3D Graphics, pp. 43-52, Cambridge, MA USA, ACM Press, Addison-Wesley (1992).
Welch et al., "Motion tracking: No silver bullet, but a respectable arsenal," IEEE Computer Graphics Applications, 22(6), pp. 24-38 (2002).
Welch et al., "High-performance wide-area optical tracking: The hiball tracking system," Presence: Teleoperators and Virtual Environments, 10(1), pp. 1-21 (2001).
Welch et al., "The hiball tracker: High-performance wide-area tracking for virtual and augmented environments," In Proceedings of the ACM Symposium on Virtual Reality Software and Technology, pp. 1-11. ACM SIGGRAPH, Addison-Wesley, University College London, London, United Kingdom (Dec. 20 -23, 1999).
Welch et al., "Scaat: Incremental tracking with incomplete information," In Turner Whitted, editor, Computer Graphics, Annual Conference on Computer Graphics & Interactive Techniques, pp. 333-344. ACM Press, Addison-Wesley, Los Angeles, CA, USA (Aug. 3-8), siggraph 97 conference proceedings edition (1997).
Welch, "SCAAT: Incremental Tracking with Incomplete Information," Ph.d. dissertation, University of North Carolina at Chapel Hill, 1996. by Gregory FrancisWelch. ill. ; 29 cm. Thesis (Ph. D.) University of North Carolina at Chapel Hill (1996).
Welch, "Hybrid self-tracker: An inertial/optical hybrid three-dimensional tracking system," Technical Report TR95-048, University of North Carolina at Chapel Hill, Department of Computer Science (1995).
Yonezawa et al., "Gaze-communicative behavior of stuffed-toy robot with joint attention and eye contact based on ambient gaze-tracking," In ICMI '07:Proceedings of the 9th international conference on Multimodal interfaces, pp. 140-145, New York, NY, USA, ACM (2007).
Yotsukura et al., "Hypermask: projecting a talking head onto real object," The Visual Computer, 18(2):111-120 (Apr. 2002).
You et al., "Orientation tracking for outdoor augmented reality registration," IEEE Computer Graphics and Applications, 19(6), pp. 36-42 (Nov./Dec. 1999).
You et al., "Hybrid inertial and vision tracking for augmented reality registration," In IEEE Virtual Reality, pp. 260-267, Houston, TX USA (1999).
Applicant Initiated Interview Summary for U.S. Appl. No. 13/254,837 (Jul. 27, 2016).
Final Office Action for U.S. Appl. No. 13/254,837 (Mar. 24, 2016).
Non-Final Office Action for U.S. Appl. No. 13/254,837 (Jul. 17, 2015).
Notification of Transmittal fo the International Search Report and the Written Opinion of the International Searching Authority, or the Declaration for International Application No. PCT/US2014/065258 (Mar. 26, 2015).

(56) References Cited

OTHER PUBLICATIONS

Jebara et al., "Mixtures of Eigenfeatures for Real-Time Structure from Texture," Sixth International Conference on Computer Vision, IEEE, pp. 128-135 (1998).
Notice of Allowance and Fee(s) Due for U.S. Appl. No. 13/254,837 (Nov. 2, 2016).

* cited by examiner

```
e_min = 0
S_best = Ø
foreach value of π_0, π_1,...., π_{n_π} do
    S = f( π_0, π_1,...., π_{n_π})
    foreach V_i ∈ V do
        foreach E_j ∈ E do
            foreach F_k ∈ F do
                e_k = Θ_E(S, V_i, E_j, F_k)
            e = aggregate (e_0, e_1,...., e_{n_F})
            if e < e_min then
                S_best = S
                e_min = e
```
⟋ 200

```
e_min = 0
S_best = Ø
n_V = 2 (two virtual models)
n_E = (four eye points)
n_F = 4 (four features per object)
for π_0 ← width_min to width_max do
    for π_1 ← height_min to height_max do
        S = f(π_0, π_1)
        for 0 ≤ i < n_V do
            for 0 ≤ j < n_E do
                for 0 ≤ k < n_F do
                    e_k = θ_E(S, V_i, E_j, F_k)
                e = √(Σ_{k=0}^{n_F} e_k^2) / n_F
                if e < e_min then
                    S_best = S
                    e_min = e
```

⟵ 400

METHODS, SYSTEMS, AND COMPUTER READABLE MEDIA FOR UTILIZING SYNTHETIC ANIMATRONICS

PRIORITY CLAIM

This application claims the benefit of U.S. Provisional Patent Application Ser. No. 61/648,384, filed May 17, 2012; the disclosure of which is incorporated herein by reference in its entirety.

GOVERNMENT INTEREST

This invention was made with government support under Grant No. N00014-90-1-0813 awarded by Office of Naval Research. The government has certain rights in The invention.

TECHNICAL FIELD

The subject matter described herein relates to methods and systems for virtual or augmented reality surfaces displays. More particularly, the subject matter described herein relates to methods, systems, and computer readable media for utilizing synthetic animatronics.

BACKGROUND

The display of artificial human-like entities may be found in prevalent existence in today's society. For example, mannequins that model clothes in department stores, animatronic characters that delight theme park visitors, human patient simulators used to train medical students and emergency responders, and telepresence systems that allow people to have a physical presence at meetings halfway across the world are commonly utilized. In most instances, it is only important that the person being displayed resembles a human (e.g., an androgynous mannequin).

In other instances, it is very important that the artificial representation resembles a specific and unique person (e.g., a single fictional or real person). For example, an animatronic character at a theme park might need to look like the same specific identifiable person all the time. Telepresence systems include similar characteristics but also have the additional requirements of flexibility and to accommodate multiple people (associated with different features) to use the system at different times. To this end, traditional graphical telepresence usually involves using a conventional flat display to show a live feed from a video camera pointed at a person/subject using the system. This setup generally allows the user to be recognized, but also has the unintended result of failing to correctly display some non-verbal cues (e.g., gaze direction, facial expressions, etc.) to multiple viewers located at respectively different viewing locations.

Recently, the use of dynamic shader lamps has been applied to telepresence and training by using a head-shaped display surface onto which live imagery of an input user is displayed. The Shader Lamps Avatar (SLA) system includes a pan-tilt-unit for controlling the orientation of the display surface to match the head pose of the user. The SLA has properties which reinforce many of the visual cues that can be expected in an actual face. The output geometry will have effects from the lighting in the output environment and features on the face will behave in accordance with a person's mental models of occlusion and perspective. Using such an animatronic SLA device helps to overcome some of the limitations exhibited by conventional flat display telepresence. For example, head pose and gaze direction are much more apparent to a wide range of viewpoints using an animatronic SLA device. However, the implementation of animatronic SLA systems to display small facial expression motions still have several shortcomings, such as actuator size limitations and an associated increase in equipment and operation costs.

Accordingly, in light of these disadvantages, there exists a need for methods, systems, and computer readable media for utilizing synthetic animatronics.

SUMMARY

Methods, systems, and computer readable media for utilizing synthetic animatronics are disclosed. According to one aspect, a method for utilizing synthetic animatronics includes providing a display surface having different regions that accommodate different positions or deformations of a subject, mapping images of the subject to the different regions on the display surface, and displaying the mapped images on the different regions of the display surface at different times in accordance with a desired animation of the subject.

The subject matter described herein may be implemented in hardware, software, firmware, or any combination thereof. As such, the terms "function" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figures 1, 2:
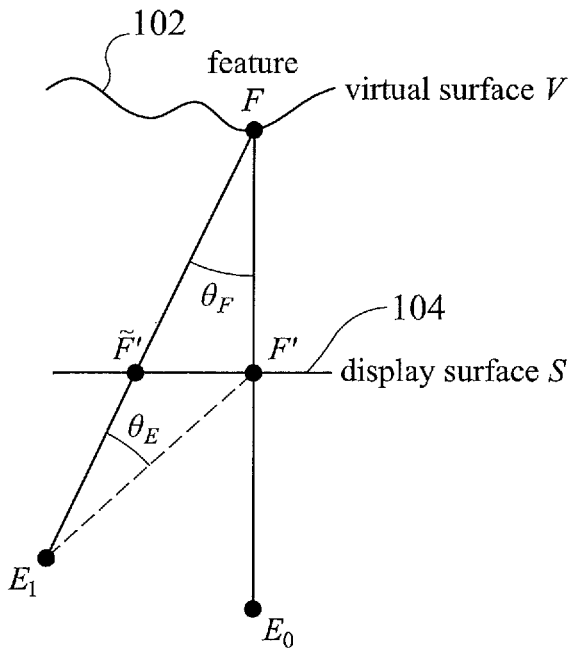
FIG. 1 is a diagram illustrating a viewing error resulting from an exemplary projection onto a display surface according to an embodiment of the subject matter described herein.
FIG. 2 illustrates an exemplary algorithm for optimizing a physical display surface according to an embodiment of the subject matter described herein.

In accordance with the subject matter disclosed herein, systems, methods, and computer readable media for utilizing synthetic animatronics are provided. The term synthetic animatronics (SA), as used herein, includes a technique to create the illusion of physical motion by projecting imagery associated with a subject onto a display surface whose geometry has been optimized for such a projection. Currently, a physical display surface may be molded and shaped to represent a human head, which may be configured to display a projected human face. Notably, if one wants to compel such a head to appear as if nodding (or turning to the left or right) a computer-controlled pan-tilt unit (PTU) would typically be utilized. A computer could be configured to issue commands to the PTU in order to pan the head left/right, or tilt up/down. The PTU would move an actuator accordingly, thereby moving the head-shaped display surface. If the dynamic posture of the moving head-shaped display surface is known, or if the projector is rigidly attached to the moving head-shaped display surface, then the projected human face can be made to "stick to" or follow the moving display surface, such that a human head and face appear to be in motion together.

Aspects related to synthetic animatronics are primarily aimed toward achieving the same apparent effect (e.g., a moving/animatronic head) but without the use of a computer-controlled PTU or any other similar electro-mechanical actuation. Instead, a display surface is optimized to an appropriate shape, such that when human faces are projected onto different locations on the display surface, it appears to nearby viewers that the head and/or face is nodding or turning to the left and/or right. In other words, the apparent animatronic movement is instead synthetic (i.e., no real or actual movement by the display surface). In some embodiments, synthetic animation may be achieved by various means such as using an appropriately shaped display surface (e.g., possibly optimized to accommodate various desired head postures of the subject and viewing positions of one or more viewers), by lighting or shading effects, by normal mapping, by other related techniques, or by a combination of these means. Although the present subject matter describes the use of a human head and face, the disclosed approach may be applied to other aspects of animatronics without departing from the scope of the present subject matter (e.g., to provide apparent animatronic behavior to full human bodies). Similarly, the disclosed approach may be applied to objects beyond humans, e.g., an apparent rotating cube from an appropriate display surface, e.g., a "swept" rotation cube surface, without departing from the scope of the present subject matter.

In some embodiments, synthetic animatronics may be conceptually considered as a geometric appearance manipulation in scenarios where the desired apparent geometry varies with time. One important distinction, however, is that the determination of the geometric correspondences between the desired apparent geometry and the physical display surface geometry may not be straightforward. For example, in the case of a human head, the tip of the nose in the desired geometry may end up in any number of places (e.g., different regions) on the physical display surface, depending on the current synthesized head pose, i.e., there is no one-to-one correspondence. If the possible animations are known ahead of time, the physical output geometry for the set of allowed poses may be optimized. Notably, it may be necessary to weight certain poses higher when optimizing for the geometry of the display surface. This may be particularly true in the case where there are distinct important poses with transition animations between poses where the perceived error during transitions is significantly less important. This aspect is discussed in greater detail below.

In some embodiments, synthetic animatronics may be utilized in telepresence and animatronic applications where an apparent slight motion is adequate. For example, synthetic animatronics may be applied to a virtual patient lying on a table in a manner that makes the virtual patient appear to respond to touch or a query from a user. Such responses may include a visual display of a nod, grimace, wince, smile, or any other apparent facial motion that provides a sense of presence (and without the need for a motor).

As indicated above, synthetic animatronics may be performed by optimizing a display surface geometry and mapping imagery onto that display surface for a plurality of poses over a defined time period. In some embodiments, a display surface geometry may be optimized by reducing associated errors. For example, an error may include a distance that exists between the display surface and a virtual surface that is being represented (or projected) onto the display surface. In one embodiment, an error associated with the display surface may be minimized by respectively minimizing the distance between a plurality of points on the display surface mapped to a plurality of associated points on a virtual surface associated with the subject (e.g., wherein the error includes the distance between a plurality of mapped points on the display surface and associated mapped points of a virtual surface associated with the subject). For example, if the display surface is optimized to accommodate a plurality of face images (e.g., the images of two or more users/persons to be displayed on the display surface at different times), such optimization may be performed by minimizing the error between for every point on each of the plurality of face images and the display surface. Such an optimization may be conducted if there is a single viewer. However, in instances where multiple viewers are involved, the angular error from a number of viewpoints should be minimized. In an alternate embodiment, the angular error may be minimized with respect to a single viewpoint, such as a viewpoint associated with a known viewing position (e.g., on a particular side of a virtual patient). In yet another embodiment, the angular error to be minimized may be integrated over a region (e.g., a viewing region) defining a plurality of viewpoints.

As an example, the illustration of FIG. 1 may be used demonstrate the determination of a viewing error ($\theta_E$) resulting from a projection onto a display surface that does match a virtual surface. Notably, FIG. 1 illustrates an exemplary method for determining the optimal physical display surface shape to use for displaying one or more virtual objects that will be viewed from multiple perspectives. As used herein with respect to the physical display surface in FIG. 1, "optimal" means that the display surface is chosen to minimize an angular viewing error that arises when the virtual object is viewed from a viewpoint other than the rendering viewpoint, and the virtual object surface is different from the physical display surface. In this scenario, features present on the virtual surface may appear in the wrong places on the physical display surface.

In some embodiments, images of the subject may be mapped to the regions of the display surface corresponding to allowed poses using the techniques described in U.S. Patent Application Publication No. 2012/0038739 for Methods, Systems, and Computer Readable Media for Shader Lamps Based Physical Avatars of Real and Virtual People, the disclosure of which is incorporated herein by reference in its entirety. The mapped images may be displayed on the regions of the display surface at different times to achieve a desired animation of the subject. For example, different images of the face of a person may be displayed on different regions of the display surface to simulate nodding of the subject's head or other desired effect. To be clear, a particular region may be used to display a particular image, color or shading at a first time period and subsequently used to display another particular image, color or shading at a second time period (e.g., point X on the display surface may be used to display an image of a nose and subsequently used to display an image of a brow during a nodding motion display). The appearance of the mapped images can be dynamically modified to reduce the perception of distortions or other visual artifacts. For example, contrast reduction or blurring can be used to dynamically modify images corresponding to successively displayed poses.

In some embodiments, the mapping of the image to a display surface may involve selecting a virtual viewpoint located inside the display surface (e.g., a human head display surface). Features from the virtual object/subject to be represented on the display surface may be mapped from the virtual viewpoint. In one example, a ray may be emitted from the virtual viewpoint and a subsequent determination is made as to where the ray intersects i) the display surface and ii) the virtual surface to be represented. If, for example, the ray traverses through a feature at the subject's eye on the virtual surface, the corresponding eye feature (e.g., coloring) may be mapped onto the display surface at the corresponding ray intersection point. This process may be performed for all points on the display surface in a continuous way or by some sampling of the surface. Such an internal virtual viewpoint may be utilized as a method for obtaining a result that is an approximation of a plurality of viewpoints.

Referring to FIG. 1, a virtual surface 102, V, and a physical display surface 104, S, are at positioned at different locations and have different shapes, i.e. S≠V. FIG. 1 further illustrates the rendering a feature F of virtual surface 102 from eye point (i.e., viewpoint) $E_0$. FIG. 1 also illustrates the use of a digital light projector to project that feature onto the physical display surface 104 at point F'. As long as the physical display surface 104 is viewed from viewpoint $E_0$, the rendered feature F' will appear to be in the proper place (i.e., F will be indistinguishable from F'). However, if the physical display surface was to be viewed from $E_1$, the virtual feature F can appear at location $\tilde{F}$', but unless the virtual surface is re-rendered from viewpoint $E_1$, the feature may remain at point F' on the physical display surface 104. This discrepancy results in an angular viewing error $\theta_E$ radians, where $\theta_E = 2\pi - \theta_F$, and $\theta_F = \arctan((\tilde{F}'-F')/(F'-F))$. Thus, if physical display surface 104 was to be viewed only from viewpoint $E_0$, the solution of calculating angular error would be inconsequential since the physical display surface shape would not matter. However, in a more general case, as physical display surface 104 is viewed from many perspectives (e.g., viewpoints) and the virtual and physical display surfaces differ from each other, viewing errors can arise as a viewer moves away from the rendered viewpoint.

FIG. 2 illustrates an exemplary algorithm 200 for determining an optimal physical display surface geometry. More specifically, algorithm 200 includes optimization pseudocode for ascertaining an optimal physical display surface under conditions in which a viewer moves away from a rendered viewpoint. Notably, algorithm 200 considers a physical display surface defined as $S=f(\pi)$, where $\pi=\{\pi_1, \pi_2, \ldots, \pi_{n_\pi}\}$ are the $n_\pi$ parameters that determine the surface shape, for some shape function f. For example, the parameters may describe a head shape. Next, algorithm 200 considers a set of virtual objects $V=\{V_0, V_1, \ldots, V_{n_v}\}$, a set of candidate eye points (or viewpoints) $E=\{E_0, E_1, \ldots, E_{n_E}\}$, and a set of object features $F=\{F_0, F_1, \ldots, F_{n_F}\}$. Note that the existence of feature correspondences for all F over the physical display surface model and all of the virtual models (i.e. over $\{S, V_0, V_1, \ldots, V_{n_v}\}$) can be assumed. Such correspondences could, for example, be established by a human and may ensure that all of the virtual objects can be compared to the physical display surface.

If the optimization space ($\pi$, V, E, F) is tractable, the optimization of a physical display surface S (e.g., surface 104 in FIG. 1) could be carried out by a search as illustrated in algorithm 200. If necessary, a nonlinear optimization strategy (e.g., Powell's method) can be utilized, but care may need to be exercised as the behavior of the viewing error function $\theta_E$ may not be very smooth, depending on the range of the parameters being used. In one embodiment, an aggregate objective function may be used to assess the viewing error over all features, virtual models, and viewpoints, for a given display surface S. For example, an average feature error, the maximum, or the root-mean-square (RMS) may be used. This is indicated by the variable, "aggregate", in algorithm 200.

Figures 3, 4:
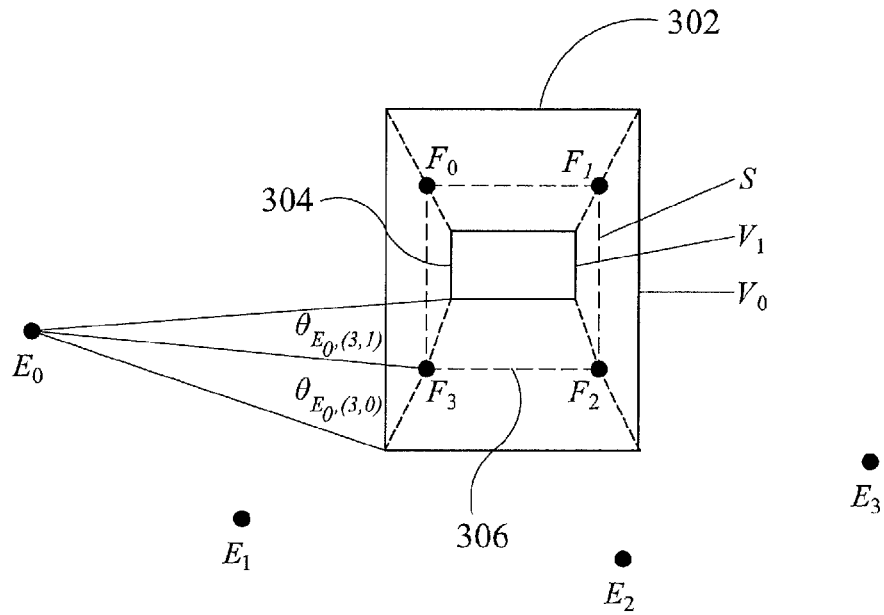
FIG. 3 is a diagram illustrating an exemplary optimization of a virtual object on a rectangular display surface according to an embodiment of the subject matter described herein.
FIG. 4 illustrates an exemplary algorithm for optimizing a two dimensional rectangular display surface according to an embodiment of the subject matter described herein.

FIG. 3 is a diagram illustrating an exemplary optimization of a virtual object on a rectangular display surface according to an embodiment of the subject matter described herein. Notably, FIG. 3 illustrates a two dimensional example of an optimization to fit a rectangular physical display surface 306 to two virtual rectangular objects 302 and 304. As shown in FIG. 3, rectangular physical display surface 306 represented as $S=f(\pi_1, \pi_2)$ shown in dashed lines ($\pi_1$=height and $\pi_2$=width) is to be fitted to two virtual rectangular objects 302 and 304 (e.g., $V=\{V_0, V_1\}$), with the scene potentially viewed from the plurality of eye points $E=\{E_0, E_1, E_2, E_3\}$. Physical display surface 306 and virtual objects 302 and 304 all include corresponding features $F=\{F_o, F_1, F_2, F_3\}$, which are illustrated with thin dotted lines in FIG. 3. More specifically, the thin dotted lines illustrate the correspondence between the features $F=\{F_o, F_1, F_2, F_3\}$ on the virtual and physical objects. The angular error perceived from eye point $E_0$ when looking at feature $F_3$ would be $\theta_{E_0,(3,0)}$ for virtual object $V_0$, and $\theta_{E_0,(3,1)}$ for virtual object $V_1$.

FIG. 4 illustrates an exemplary algorithm 400 that determines the optimal physical display surface of a two dimensional (2D) rectangular surface, not unlike the surface depicted in FIG. 3. Notably, exemplary pseudocode for the optimization is presented as algorithm 400 in FIG. 4. Algorithm 400 may be configured to use a minimum root-mean-square (RMS) aggregate view error as the objective. Algorithm 400 may be utilized to consider conditions in which a viewer moves away from a rendered viewpoint. In one embodiment, optimization algorithm 400 includes the determination of the optimal surface via iterating (i.e., looping) through a plurality of possible width and height values for the display surface. Algorithm 400 may then check for an aggregate error for i) each virtual surface, ii) each eye point, and iii) each feature. As illustrated in FIG. 4, algorithm 400 may attempt to minimize the RMS aggregate view error.

Figure 5:
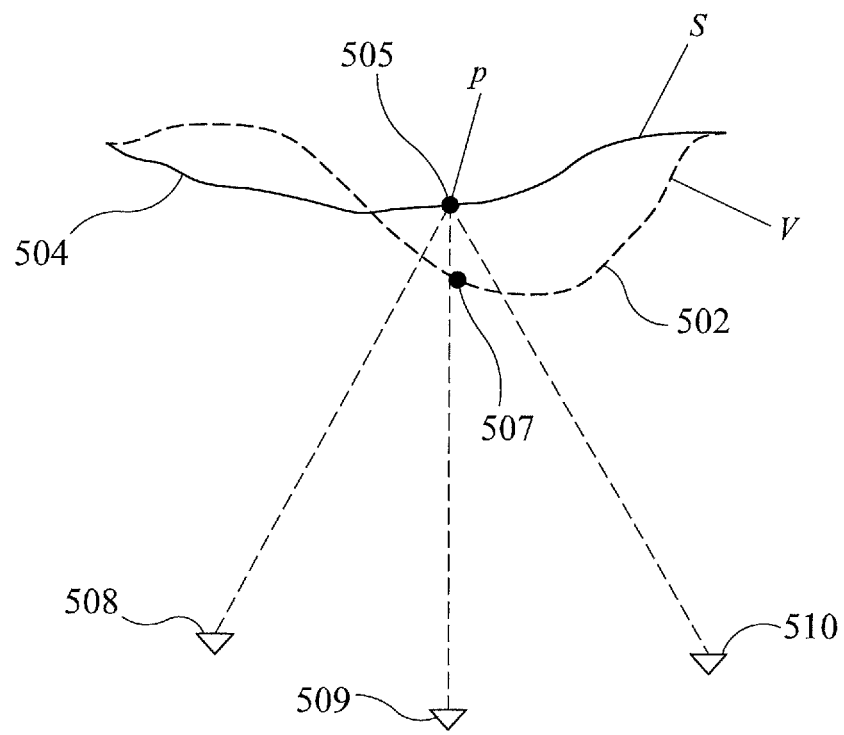
FIG. 5 is a diagram illustrating the determining the coloring of a point on a virtual surface shading to an embodiment of the subject matter described herein.

Once the optimization of the physical display surface has been conducted in a manner described above, the present subject matter performs a shading or color selection computation. FIG. 5 depicts an exemplary shading determination (or color selection) process. Namely, FIG. 5 includes an input diffuse surface (V) 502 (e.g., a virtual surface of a subject) and an output diffuse surface (S) 504 (e.g., a physical display surface). In one embodiment, input diffuse surface 502 includes the desired image of a subject. Similarly, output diffuse surface 504 displays a projected image that should resemble diffuse surface 502 as much as possible. For any given point or patch (p) 505 on output diffuse surface 504, a point (e.g., point 507) on input diffuse surface 502 that is closest to what all viewers 508-510 may expect to see at patch p if a viewer were actually looking at input diffuse surface 502 can be determined. More specifically, it is desirable to make point 505 on output diffuse surface 504 to have similar visual properties as the corresponding point 507 on input diffuse surface 502.

Figure 6:
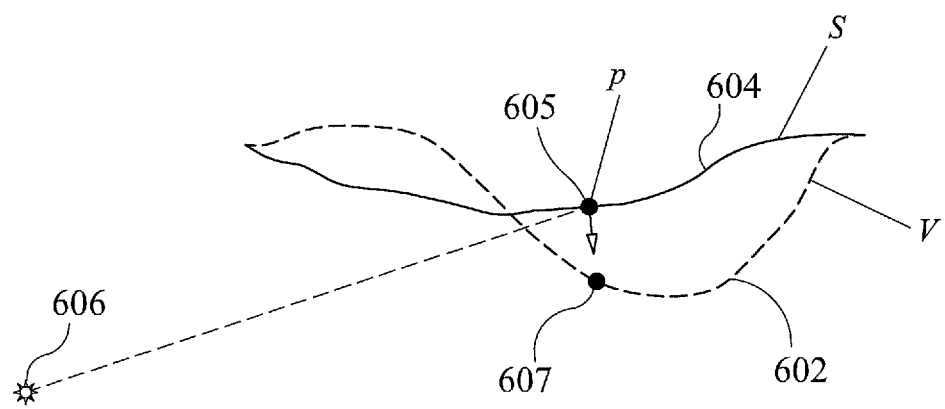
FIG. 6 is a diagram illustrating the calculating of shading due to lighting at a point on the display surface according to an embodiment of the subject matter described herein.

FIG. 6 is a diagram illustrating the calculating of shading due to lighting at a point on a display surface according to an embodiment of the subject matter described herein. In some embodiments, the shading calculation of a point on the physical display surface may be determined by first compensating for lighting effects due to the surface geometry of output diffuse surface (e.g., surface 604 in FIG. 6). If a model for the lighting environment at the output surface is available, the current shading at point 605 (due to light source 606 in FIG. 6) may be computed. For a diffuse surface, this shading may be invariant to a viewpoint.

Figure 7:
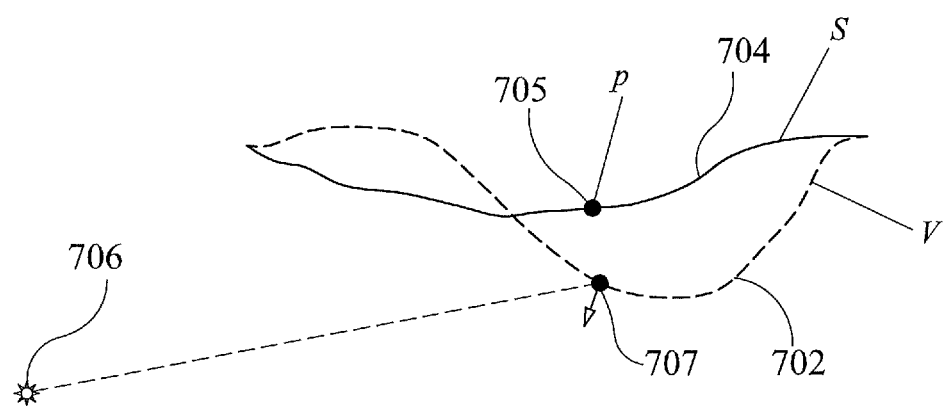
FIG. 7 is a diagram illustrating the current shading of a point on a virtual surface according to an embodiment of the subject matter described herein.

FIG. 7 is a diagram illustrating a current shading of a point on a virtual surface according to an embodiment of the subject matter described herein. In one embodiment, after the lighting effects due to the geometry of the display surface is compensated, the shading for a point 707 on V is calculated. Such a calculation is conducted under the lighting conditions at output surface 704. If the input is a virtual input, then the difference between the current shading of output surface 704 and the desired shading for said surface to appear as input surface 702 may be calculated. More specifically, it may be desirable to shade or color output surface 704 as if it were the input surface 702 lit by the environment around output surface 704 (e.g., use the lighting at point 707 via light source 706 to shade point 705). Brightness levels may then be increased or decreased accordingly.

In conclusion, the shading determination computation method illustrated by FIGS. 5, 6, and 7 may be summarized as follows. First, the brightness of a captured input surface is normalized with respect to environmental lighting. The result of such a step includes lighting-independent color information of the input surface. Notably, this step is not necessary in instances where a virtual input is used. Next, the lighting on the output surface is similarly normalized. The result of this compensation image computation includes the appearance of a constant grey brightness across the entire un-colored output surface. Afterwards, the expected lighting of the uncolored input surface under output lighting conditions is computed. Lastly, the sum of the normalized lighting of the captured input surface, the normalized lighting on the output surface, and the expected lighting of the uncolored input surface under output lighting conditions may be calculated by adding all three values together to compute a shading value.

In some embodiments, the color selection process may be conducted by emitting a light ray until it traverses the virtual surface at a particular point (e.g., a portion of the nose image). The color at that particular point on the virtual surface (i.e., imagery) may be identified. The identified color may then be placed on a point on physical display surface that is mapped to the aforementioned particular point on the virtual surface. This color selection process may be performed for all points on the display surface on a continuous basis.

It is important to note that the manner as to how color is placed on the display surface is inconsequential as compared to the manner of what color is selected. That is, color may be placed on the display surface via paint, projection of imagery (e.g., front or rear projection), a latex covering, and the like. Notably, any technique that places color on the surface of the physical display surface may be used.

The techniques mentioned above may be utilized for conducting synthetic animatronics. However, some degree of error may be introduced in such instances where the projection of a subject image onto a display surface is conducted over a predefined period of time. More specifically, The error function or "cost" computation for the purposes of optimizing a display geometry for synthetic animatronics could involve simply including some temporal sampling of intermediate animation poses and then optimizing as for a multi-pose case. In a multi-pose case, the present subject matter may map, over a predefined period of time, images of a particular subject onto a display surface for a plurality of poses, which include key poses (e.g., the start and ending poses) and transition poses (e.g., intermediate poses occurring between key poses). Notably, greater error may be tolerable for the brief transition poses occurring between key poses. Accordingly, a weighted optimization may be utilized to allow for better results at the key poses at the cost of greater error exhibited by the transition poses. In the instance where conducting such a weighted optimization results in severely high error for some small set of transition poses, it may be preferable to avoid a "break in presence" by adapting (e.g., fading or blurring) the imagery at certain times during the animation. For example, transition poses may be characterized to allow for more error during the movement between poses (or frames).

For example, mapped images may be displayed on regions of a display surface at different times (i.e., over a predefined period of time) to achieve a desired animation of the subject. For example, different images of the face of a person may be displayed on different regions of the display surface to simulate the nodding of the subject's head, a smile of the subject's face, or some other desired like effect. The appearance of the mapped images can be dynamically modified to reduce the perception of distortions or other visual artifacts. For example, a technique such as contrast reduction or blurring may be used to dynamically modify images corresponding to successively displayed poses.

In some embodiments, the present subject matter may make adjustments or slight alterations to the projected imagery to achieve a greater degree of visual fidelity. For example, the range of the movement captured from a subject may be limited in a manner such that the image of the subject is restricted on the display surface (e.g., as to prevent the image of the nose appearing on the cheek region/area of the display surface). Similarly, the width of a smile may be limited so as to accommodate (e.g., not exceed) the mouth region/area of the display surface. As another example, if a subject shakes his head, the corresponding displayed image of the subject may appear to rotate the back of the head instead of the front of the head. In short, the present subject matter utilize any measure to modify a subject's image in order to achieve an acceptable (if not a complete and true) visual representation of a subject's captured motion.

One goal of the present subject matter pertains to creating realistic life-size human replicas that can be inhabited and controlled dynamically by a remote person, serving as that person's "representative" in a distant environment (e.g., during a transcontinental business meeting). To facilitate such sophisticated communications, the present subject matter attempts to recreate subtle cues beyond transmitting audio and video projected onto a rigid head shape. These subtle cues may include static cues (e.g., body shape and size) and dynamic cues (e.g., gestures and facial expressions). Notably, the aforementioned techniques of synthetic animatronics may be combined with a number of measures that are related to both static head/face size and dynamic expressions.

In one embodiment, the present subject matter may also be configured to employ head-face deformation techniques that may be facilitated and controlled by inflatable chambers. One example may be the use of inflatable chambers to simulate or represent inflated cheeks on an animatronic avatar. Such an embodiment may comprise a face construct that includes of one or more joined membranes with smoothly or locally sharply varying thickness that cover one or more individually inflatable chambers. This type of face construct may further include rigid structural elements and/or may be actuated by a computer-controlled pneumatic (e.g., (hydro-pneumatic) mechanism. By utilizing a pneumatic mechanism, the chambers may change in size and shape as one chamber comes in contact with one or more neighboring chambers. The change in size and shape of the chamber may occur either near-statically or dynamically, thereby affecting the size and shape of the entire head structure.

In one embodiment, near-static operation may be used to match the sizes and shapes of the heads of various people, ranging from a small child to a large adult. The device may also match vastly different facial features by appropriately varying inter-eye separation and various ratios of distances between key features, and perhaps even quasi-static shape details, such as nostril size. Similarly, dynamic operation of this technology may be used to assist with various facial expressions. While much of a facial expression can be conveyed via video texture mapping, complementary and matching shape changes (e.g., increased cheek protrusion and lifting, coupled with narrowing eye slits during smiling) can have a significant contribution and impact toward the presence of an avatar.

In an alternate embodiment, the present subject matter may also be configured to employ head-face deformation techniques that may be facilitated and controlled by mechanical actuators. For instance, one such embodiment may include a membrane-like face, with deformations effected by a system of mechanical elements that are actuated electrically or pneumatically (e.g., hydro-pneumatically), such as a recreated rigid yet movable jawbone structure. Such a jawbone structure may be used to dynamically stretch the membrane-like face downwards as the mouth opens to talk, laugh, and the like (i.e., the only moving bone/part that affects facial shape). Other components that can be affected by the aforementioned dynamic deformation technique but are not connected to bone motion in human anatomy may include cheek inflation, nostril motion, or any other motion that provides more subtle changes in the face. Similarly, static changes, such as overall head size or face shape, may be controlled by a system of curved panels pushed outward by piston-like actuators emanating radially from the center of the skull. For example, overlapping mobile panels whose visible external surface is prepared to appear as human skin or receive dynamic front-projected textures may be used. Moreover, the overlapping mobile panels may slide over each other in order to conceal any gaps. While head-face deformation controlled by inflatable chambers may likely present challenges when combined with rear-projected facial textures, mechanical actuators may be designed and positioned in a manner that avoids intrusion into a projector path. For example, the aforementioned jawbone system may be constructed as a thin metallic structure located at the bottom of the jaw while the temporomandibular joint and actuating hardware located outside the field of view of a rear-projection path for the face.

In an alternate embodiment, the present subject matter may also be configured to employ dynamic head-face deformation techniques that may be facilitated and controlled by an elasto-mechanically controlled means. Although more complex than the abovementioned techniques, elasto-mechanically controlled dynamic deformation may be readily utilized for facial deformation and is anatomically more precise. It is envisioned that some of the facial control muscles may be replicated from a substance that can be elastically deformed. Taking advantage of the notion that muscle fibers can only contract (not expand) under nerve control, a system of contraction cables may be embedded in each muscle associated with a display surface. One area of each simulated muscle is connected to the membrane skin, while another area may be connected to a rigid skull replica. For example, the muscle connection areas may either be located at the end of the muscle in elongated muscles, such as the zygomaticus major, or may be ring-shaped in sphincter muscles, such as the orbicularis oculi. The muscle side of the entire face-membrane-muscle assembly may be filled (between muscles) with a flexible substance that simulates a fat layer. Electrical or pneumatic actuators (e.g., hydropneumatic actuators) for the muscle contraction cables are located within the rigid skull of the display surface. In one embodiment, detecting which muscle to actuate may require performing facial electromyography on the inhibitor.

In an alternate embodiment, the display surface may comprise a flexible surface such as an organic light emitting diode (OLED) material, latex material, or the like. In yet another embodiment, a hybrid system that combines two or more of the above techniques may be utilized along with the present subject matter.

Figure 8:
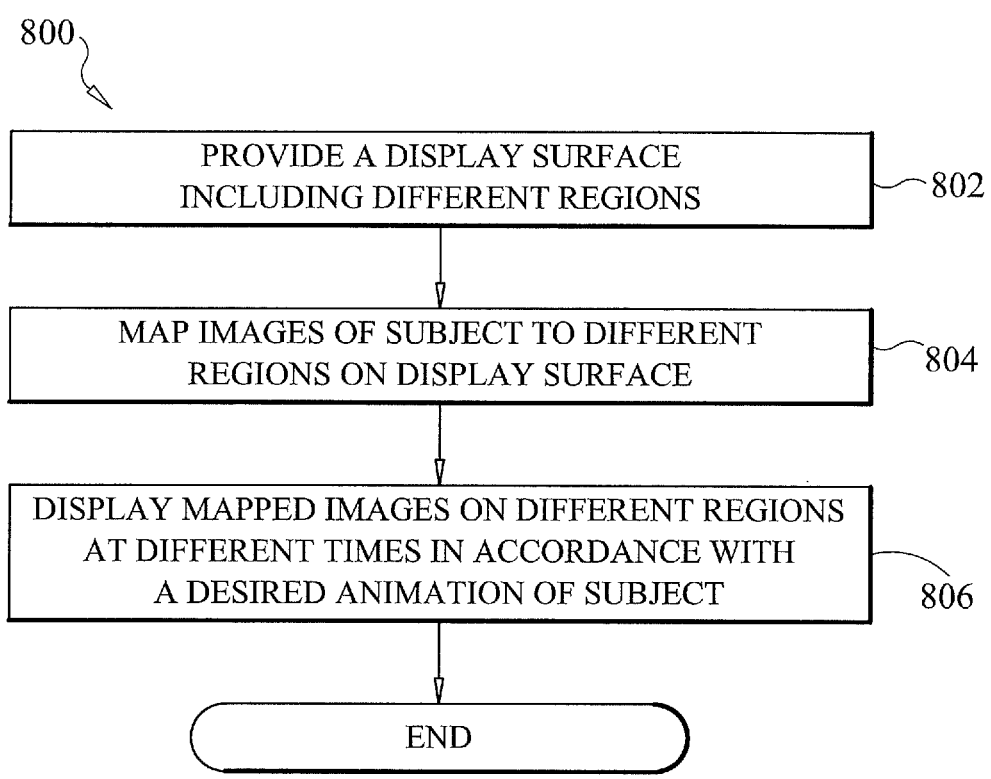
FIG. 8 is a flow chart illustrating an exemplary process for utilizing synthetic animatronics according to an embodiment of the subject matter described herein.

FIG. 8 is a flow chart illustrating an exemplary method 800 for utilizing synthetic animatronics according to an embodiment of the subject matter described herein. In step 802, a display surface including different regions that accommodate different positions or deformations of a subject is provided.

In step 804, images of the subject to the different regions are mapped on the display surface.

In step 806, the mapped images are displayed on the different regions of the display surface at different times in accordance with a desired animation of the subject.

Figure 9:
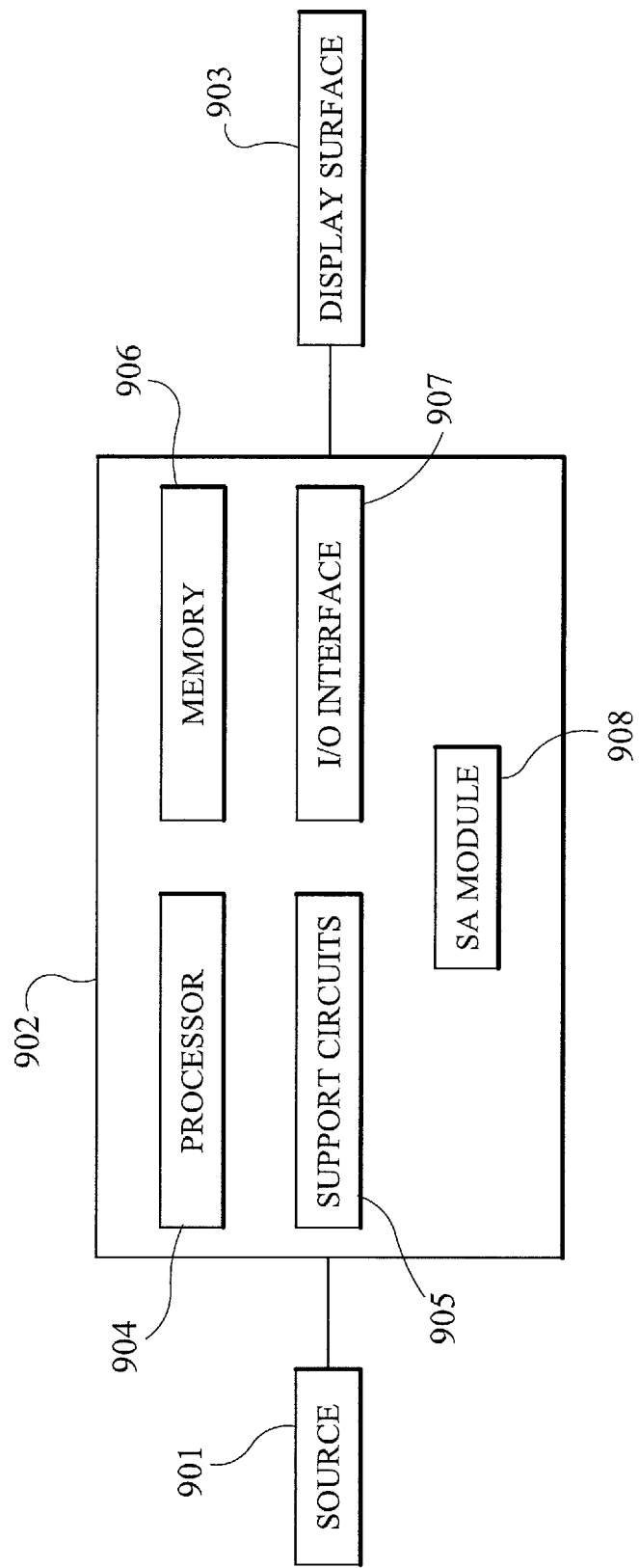
FIG. 9 is a block diagram illustrating a system for utilizing synthetic animatronics according to an embodiment of the subject matter described herein.

FIG. 9 is a block diagram depicting an exemplary embodiment of a computer 902 suitable for implementing the processes and methods described herein. Computer 902 may include a processor 904, a memory 906, various support circuits 905, an input/output (I/O) interface 907, and a synthetic animatronic module 908. Processor 904 may be a microprocessor, central processing unit (CPU), or any other like hardware based processor unit. The support circuits 905 for the processor 904 include conventional cache, power supplies, clock circuits, data registers, and the like. I/O interface 907 may be directly coupled to memory 906 or coupled through processor 904. I/O interface 907 may be coupled to various input devices and output devices, such as a conventional keyboard, mouse, printer, display, and the like. I/O interface 907 may also be used to connect computer 902 to source 901 and display surface 903.

Memory 906 may store all or portions of one or more programs and/or data to implement the processes and methods described herein. Notably, memory 906 may store data provisioning software for providing transaction data, as described above. Although one or more aspects of the present subject matter are disclosed as being implemented as a computer executing a computer readable program, the present subject matter may be implemented in hardware, software, or a combination of hardware and software. Such implementations may include a number of processors independently executing various programs and dedicated hardware, such as ASICs.

Computer 902 may be programmed with an operating system, which may be Java Virtual Machine, Linux, Unix, OS X, and Windows, among other known platforms. At least a portion of an operating system may be disposed in the memory 906. Memory 906 may include one or more of the following random access memory (RAM), read only memory (ROM), optical read/write memory, cache memory, magnetic read/write memory, flash memory, and the like.

In one embodiment, synthetic animatronics (SA) module 908 can be loaded into memory 906 and executed by processor 904 to implement the functions, calculations, and determinations discussed above. As such, synthetic animatronics module 908 can be stored on a computer readable medium, e.g., RAM memory, magnetic or optical drive or flash memory, and the like. In one embodiment, SA module 908 may include a plurality of modules, each of which performs a distinct function (e.g., a first module for mapping images of the subject to different regions on a display service and a second module for displaying the mapped images on the different regions of the display surface at different times in accordance with a desired animation of a subject).

In one example, computer 902 may receive an input from a source 901. Source 901 may include a virtual image source or a camera that captures an image of a subject (e.g., a face image of a human subject). Upon receiving the input from source 901, synthetic animatronics module 908 may process the input to derive a unique output in a manner described above (e.g., determining the mapping of the received imagery onto a display surface for a plurality of poses over a predesignated period of time). Such output is provided to display surface 903, which as indicated above may include an optimized head-face display model. In one embodiment, the output may be provided to display surface 903 via a projections means (e.g., a rear projector or a front projector). Display surface 903 may include any surface that accommodates different deformations or positions of a subject being animated. For example, in the case of a human head, the display surface may include regions that correspond to allowed poses of the human head.

In one embodiment, the present subject matter may include a method for utilizing synthetic animatronics that includes providing a display surface comprising different regions that accommodate different positions or deformations of a subject, mapping images of the subject to the different regions on the display surface, and displaying the mapped images on the different regions of the display surface at over a predetermined period of time in accordance with a desired animation of the subject.

In another embodiment, the present subject matter includes the aforementioned method for utilizing synthetic animatronics that further comprises optimizing the surface geometry of the display surface.

In another embodiment, the present subject matter includes the aforementioned method for utilizing synthetic animatronics that further comprises optimizing the surface geometry of the display surface by minimizing an error.

In another embodiment, the present subject matter includes the aforementioned method for utilizing synthetic animatronics that further comprises minimizing the error by respectively minimizing the distance between a plurality of points on the display surface mapped to a plurality of associated points on a virtual surface associated with the subject.

In another embodiment, the present subject matter includes the aforementioned method for utilizing synthetic animatronics that further comprises minimizing an angular error from a single viewpoint.

In another embodiment, the present subject matter includes the aforementioned method for utilizing synthetic animatronics that further comprises minimizing an angular error integrated over a region defining a plurality of viewpoints.

In another embodiment, the present subject matter includes the aforementioned method for utilizing synthetic animatronics that further comprises mapping images of the subject onto the display surface for a plurality of poses.

In another embodiment, the present subject matter includes the aforementioned method for utilizing synthetic animatronics that further comprises mapping images of the subject onto the display surface for a plurality of poses, wherein the plurality of poses includes key poses and transition poses.

In another embodiment, the present subject matter includes the aforementioned method for utilizing synthetic animatronics further comprises transitioning, over a period of time, from at least a first key pose to a second key pose on the display surface.

In another embodiment, the present subject matter includes the aforementioned method for utilizing synthetic animatronics that further comprises the display surface which is optimized to separately accommodate at least an image of a first subject and an image of a second subject.

In another embodiment, the present subject matter includes the aforementioned method for utilizing synthetic animatronics that further comprises displaying the mapped images on the display surface via a rear projection or a front projection.

In another embodiment, the present subject matter includes the aforementioned method for utilizing synthetic animatronics that further comprises a display surface that is applied with color via painting or a projection of an image.

In another embodiment, the present subject matter includes the aforementioned method for utilizing synthetic animatronics wherein the display surface includes a flexible surface.

In another embodiment, the present subject matter includes the aforementioned method for utilizing synthetic animatronics wherein the display surface includes a flexible surface includes an organic light emitting diode (OLED) surface display.

In another embodiment, the present subject matter includes the aforementioned method for utilizing synthetic animatronics further comprises transitioning, over a defined period of time, from at least a first key pose to a second key pose on the display surface.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for conducting synthetic animatronics, the method comprising:
    providing a 3-D display surface having different regions that accommodate different positions or deformations of a 3-D representation of a subject;
    mapping a plurality of points on a 3-D virtual surface representing the subject to a plurality of points on the 3-D display surface such that the mapping accommodates imagery of a plurality of poses of the 3-D representation of the subject over a period of time;
    dynamically modifying the mapped imagery corresponding to successive poses of the subject represented by the virtual imagery to reduce perception of distortion or other visual artifacts; and
    displaying the mapped imagery on the different regions of the display surface at different times over the period of time in order to achieve a desired animation of the plurality of poses of the 3-D representation of the subject, wherein achieving the desired animation includes producing, synthetically and without real movement of the 3-D display surface, apparent animatronic movement of the subject from a plurality of different viewpoints.

2. The method of claim 1 wherein dynamically modifying the appearance of the mapped imagery includes modifying the appearances via blurring or contrast reduction.

3. The method of claim 1 wherein the 3-D representation of the subject comprises a 3-D representation of a human anatomical structure.

4. The method of claim 3 wherein the display surface supports deformation techniques utilizing at least one of adjustable inflatable chambers, a membrane-like assembly that is modifiable via mechanical actuators, and a system of contractions cables embedding in replicated muscles in the display surface.

5. A system for conducting synthetic animatronics, the system comprising:
    a 3-D display surface including different regions that accommodate different positions or deformations of a 3-D representation of a subject; and
    a computer for performing synthetic animatronics that includes a synthetic animatronics module configured to map a plurality of points on a 3-D virtual surface representing the subject to a plurality of points on the 3-D display surface such that the mapping accommodates imagery of a plurality of poses of the 3-D representation of the subject over a period of time, to dynamically modify the mapped imagery corresponding to successive poses of the subject represented by the virtual imagery to reduce perception of distortion or other visual artifacts, and to display the mapped imagery on the different regions of the display surface at different times over the period of time in order to achieve a desired animation of the plurality of poses of the 3-D representation of the subject, wherein achieving the desired animation includes producing, synthetically and without real movement of the 3-D display surface, apparent animatronic movement of the subject.

6. The system of claim 5 wherein the synthetic animatronics module is further configured to modify the appearances via blurring or contrast reduction.

7. The system of claim 5 wherein the 3-D representation of the subject comprises a 3-D representation of a human anatomical structure.

8. The system of claim 7 wherein the display surface supports deformation techniques utilizing at least one of adjustable inflatable chambers, a membrane-like assembly that is modifiable via mechanical actuators, and a system of contractions cables embedding in replicated muscles in the display surface.

9. A non-transitory computer readable medium having stored thereon executable instructions that when executed by the processor of a computer control the computer to perform steps comprising:
    mapping a plurality of points on a 3-D virtual surface representing the subject to a plurality of points on the 3-D display surface such that the mapping accommodates imagery of a plurality of poses of the 3-D representation of the subject over a period of time, wherein the display surface includes the different regions that accommodate different positions or deformations of a subject;
    dynamically modifying the mapped imagery corresponding to successive poses of the subject represented by the virtual imagery to reduce perception of distortion or other visual artifacts; and
    displaying the mapped imagery on the different regions of the display surface at different times over the period of time in order to achieve a desired animation of the plurality of poses of the 3-D representation of the subject, wherein achieving the desired animation includes producing, synthetically and without real movement of the 3-D display surface, apparent animatronic movement of the subject from a plurality of different viewpoints.

10. The computer readable medium of claim 9 wherein dynamically modifying the appearance of the mapped imagery includes modifying the appearances via blurring or contrast reduction.

11. The computer readable medium of claim 9 wherein the 3-D representation of the subject comprises a 3-D representation of a human anatomical structure.

12. The computer readable medium of claim 11 wherein the display surface supports deformation techniques utilizing at least one of adjustable inflatable chambers, a membrane-like assembly that is modifiable via mechanical actuators, and a system of contractions cables embedding in replicated muscles in the display surface.

* * * * *